(12) United States Patent
Kawagoe et al.

(10) Patent No.: US 12,220,947 B2
(45) Date of Patent: Feb. 11, 2025

(54) TIRE

(71) Applicant: Sumitomo Rubber Industries, Ltd., Kobe (JP)

(72) Inventors: Yoshifumi Kawagoe, Kobe (JP); Koichi Nakajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 42 days.

(21) Appl. No.: 18/105,449

(22) Filed: Feb. 3, 2023

(65) Prior Publication Data

US 2023/0264522 A1     Aug. 24, 2023

(30) Foreign Application Priority Data

Feb. 24, 2022    (JP) ................................ 2022-026993

(51) Int. Cl.
*B60C 13/00*     (2006.01)
(52) U.S. Cl.
CPC ................... *B60C 13/001* (2013.01)
(58) Field of Classification Search
CPC ...... B60C 13/001; B60C 13/002; B60C 13/02
See application file for complete search history.

(56) References Cited

U.S. PATENT DOCUMENTS

| | | | | |
|---|---|---|---|---|
| 2008/0283169 A1* | 11/2008 | Sato | ...................... | B60C 13/001 152/450 |
| 2015/0367687 A1* | 12/2015 | Kimura | ................. | B60C 13/001 152/523 |
| 2020/0247192 A1 | 8/2020 | Nakajima | | |

FOREIGN PATENT DOCUMENTS

| | | | | |
|---|---|---|---|---|
| JP | 11321242 A | * | 11/1999 | |
| JP | 2020-125045 A | | 8/2020 | |
| JP | 2020131906 A | * | 8/2020 | ........... B60C 13/001 |

OTHER PUBLICATIONS

Fujita, English Machine Translation of JP 2020131906, 2020 (Year: 2020).*
Itabashi, English Machine Translation of JP H11321242, 1999 (Year: 1999).*

* cited by examiner

*Primary Examiner* — Justin R Fischer
*Assistant Examiner* — Brendon Charles Darby
(74) *Attorney, Agent, or Firm* — Birch, Stewart, Kolasch & Birch, LLP (57) ABSTRACT

A tire includes a pair of sidewall portions. An outer surface of at least one of the sidewall portions includes at least one concave mark recessed from a reference surface. The or each concave mark includes a bottom surface and an inner wall surface. The bottom surface includes a peripheral region and a main region. The peripheral region includes a shadow region and a non-shadow region. The shadow region and the non-shadow region are each formed with an uneven surface provided with minute protuberances. A width of the uneven surface of the non-shadow region measured in a direction perpendicular to a contour of the or each concave mark is smaller than a width of the uneven surface of the shadow region measured in a direction perpendicular to the contour.

19 Claims, 6 Drawing Sheets

TIRE

RELATED APPLICATIONS

This application claims the benefit of foreign priority to Japanese Patent Applications No. JP2022-026993, filed Feb. 24, 2022, which are incorporated by reference in its entirety.

FIELD OF THE INVENTION

The present disclosure relates to a tire.

BACKGROUND OF THE INVENTION

Japanese Unexamined Patent Application Publication No. 2020-125045 (Patent Literature 1) has proposed a tire having a sidewall portion provided with concave marks. In the above-mentioned tire, a bottom surface of each of the concave marks includes a shadow region which is a part of the bottom surface in shadow of a wall of the concave mark, and the shadow region has a plurality of minute protuberances. The minute protuberances configured as such provide contrast to the bottom surfaces of the concave marks, and thus improve the visibility of the concave marks.

SUMMARY OF THE INVENTION

In recent years, there has been a demand for further improvement in the visibility of concave marks on tire sidewalls. In particular, in the concave marks of Patent Literature 1, it was sometimes difficult to visually recognize the entire contour of each of the concave marks depending on the direction of light (viewing direction).

The present disclosure was made in view of the above, and a primary object thereof is to provide a tire capable of exerting excellent visibility of the concave marks on the sidewall portions.

The present disclosure is a tire including a pair of sidewall portions, wherein
  an outer surface of at least one of the sidewall portions includes at least one concave mark recessed from a reference surface,
  the or each concave mark includes a bottom surface and an inner wall surface extending in a depth direction of the or each concave mark to surround the bottom surface,
  the bottom surface includes a peripheral region extending along a contour of the or each concave mark and a main region surrounded by the peripheral region,
  the peripheral region includes a shadow region and a non-shadow region,
  the shadow region is a region where the shadow of the inner wall surface is formed when light is assumed to be shed to the or each concave mark from a first direction,
  the non-shadow region is a region where the shadow of the inner wall surface is not formed when light is assumed to be shed to the or each concave mark from the first direction,
  each of the shadow region and the non-shadow region is formed with an uneven surface provided with a plurality of minute protuberances, and
  a width (W2) of the uneven surface of the non-shadow region measured in a direction perpendicular to the contour is smaller than a width (W1) of the uneven surface of the shadow region measured in a direction perpendicular to the contour.

The tire of the present disclosure can exert excellent visibility with respect to the concave marks on the sidewall portions by adopting the above configuration.

DETAILED DESCRIPTION OF THE INVENTION

Figure 1:
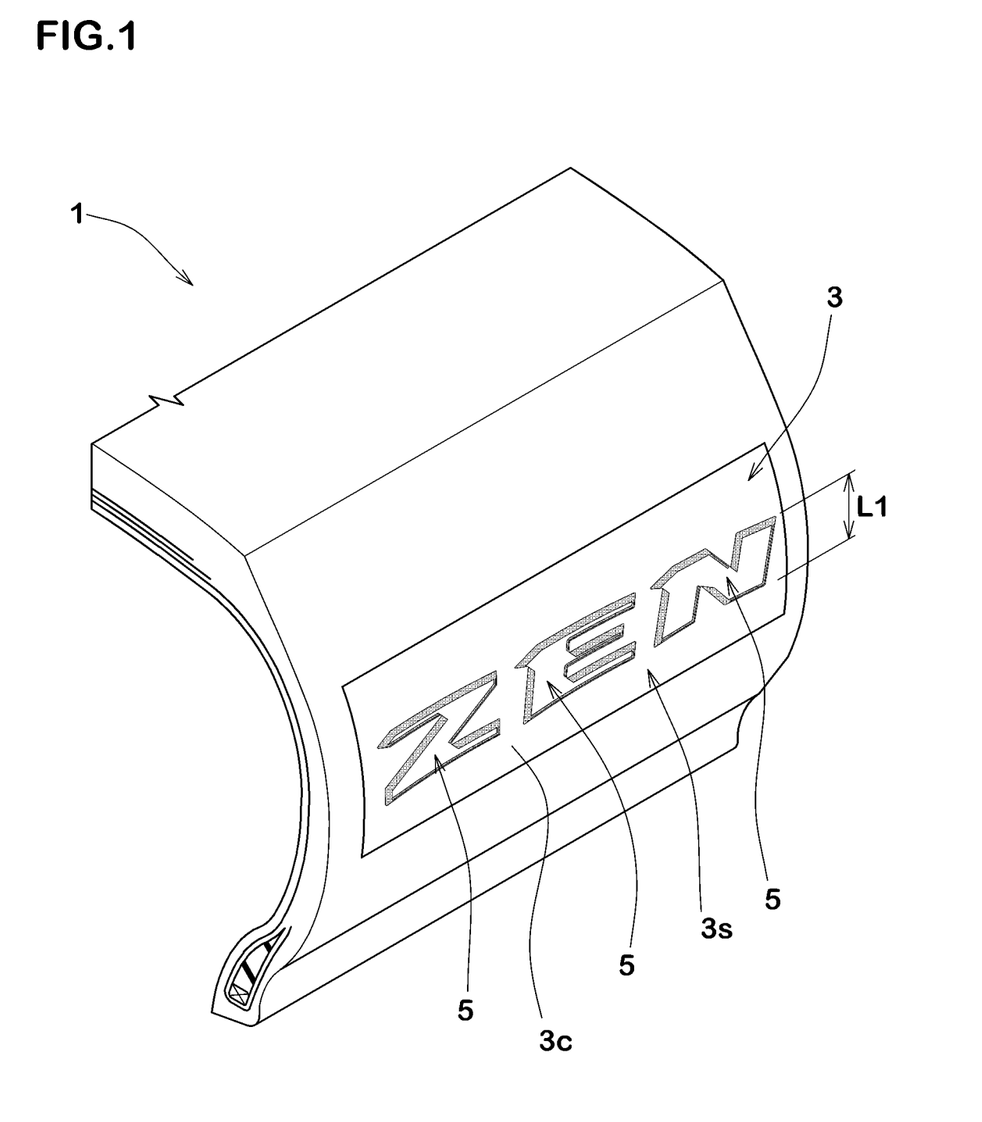
FIG. 1 is an enlarged perspective view of a sidewall portion of a tire according to the present embodiment.

An embodiment of the present disclosure will now be described below in conjunction with accompanying drawings. FIG. 1 is an enlarged perspective view of one of sidewall portions 3 of a tire 1 according to one embodiment of the present disclosure. The tire 1 of the present disclosure has a pair of the sidewall portions 3 and FIG. 1 shows a portion of an outer surface of one of the sidewall portions 3. As shown in FIG. 1, the tire 1 of the present disclosure is used as a pneumatic tire for passenger cars, for example. The present disclosure may be applied to motorcycle tires and heavy-duty tires, for example.

As shown in FIG. 1, each of the sidewall portions 3 have a visible outer surface (3s). The visible outer surface (3s) is the surface visible from the outside when the tire is in use. At least one of the outer surfaces (3s) of the pair of the sidewall portions 3 includes at least one concave mark 5 recessed from a reference surface (3c). Although "Z", "E", and "N" are described as the concave marks 5 in FIG. 1, the present disclosure is not limited to such embodiments. It should be noted that the reference surface (3c) is a portion of the outer surface (3s) around the at least one concave mark 5.

Figure 2:
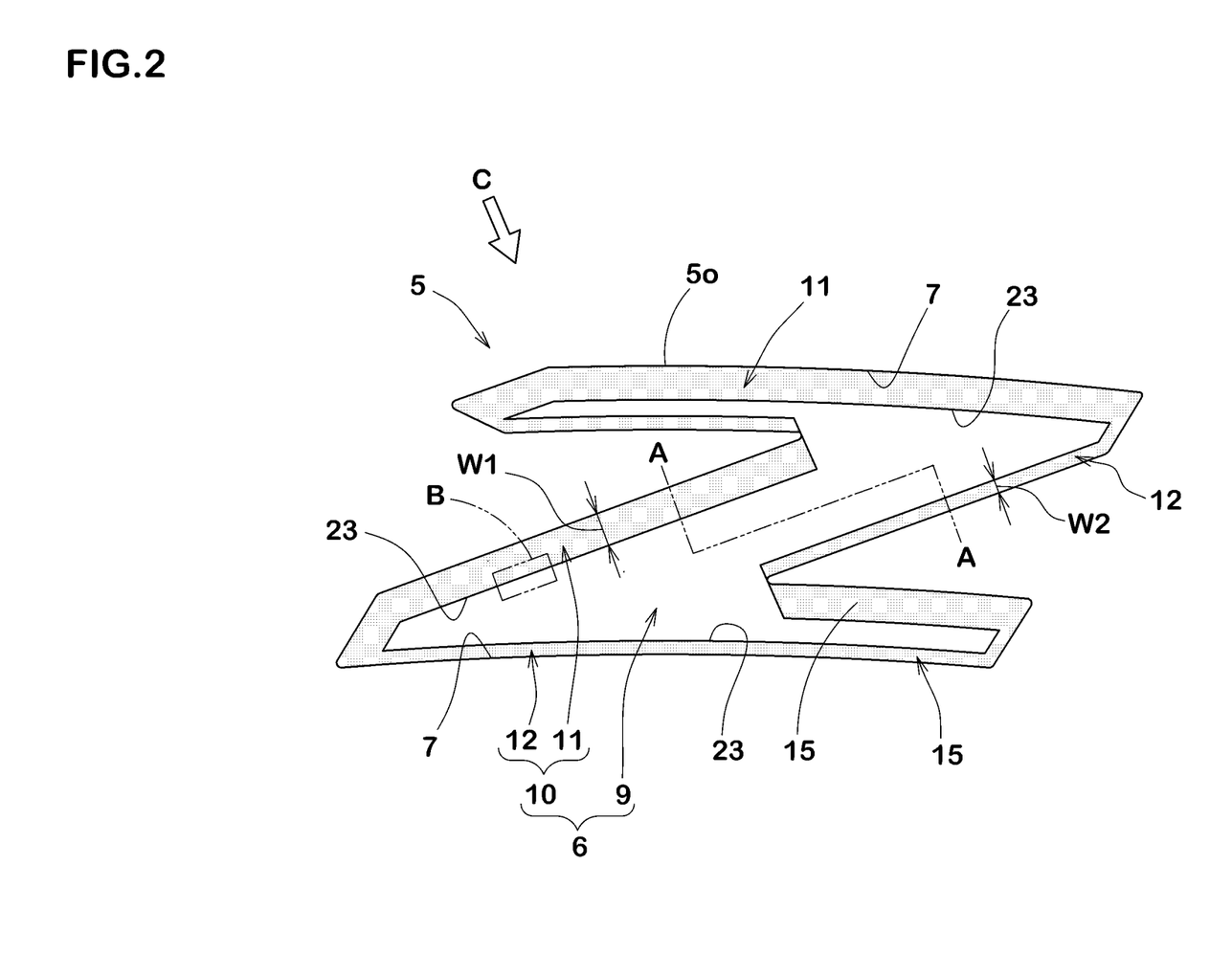
FIG. 2 is an enlarged plan view of one of the concave marks of FIG. 1.
Figure 3:
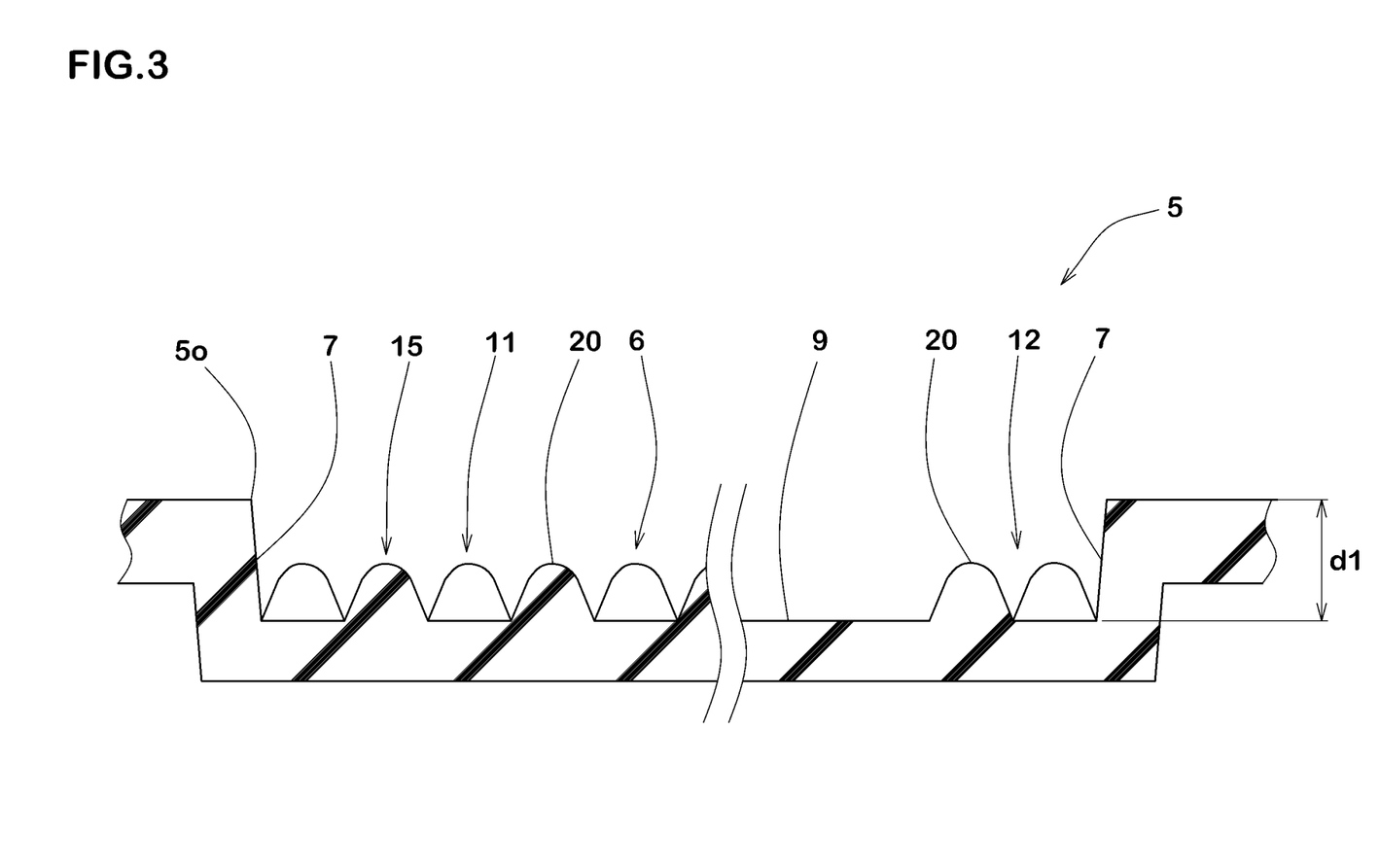
FIG. 3 is an A-A cross sectional view of FIG. 2.

FIG. 2 shows an enlarged plan view of one of the concave marks 5 of FIG. 1. FIG. 3 shows an A-A cross-section of the concave mark 5 of FIG. 2. As shown in FIGS. 2 and 3, each of the concave marks 5 includes a bottom surface 6 and an inner wall surface 7 extending in a depth direction of the concave mark 5 to surround the bottom surface 6. As shown in FIG. 3, a depth (d1) of each of the concave marks 5 is, for example, 1.5 mm or less, preferably 1.0 mm or less, and more preferably from 0.4 to 0.7 mm.

It should be noted that in the present specification, unless otherwise specified, dimensions of various parts of the tire are measured with the tire in a standard state. In the case of a pneumatic tire for which various standards are specified, the term "standard state" refers to a state in which the tire is mounted on a standard rim, inflated to a standard inner pressure, and loaded with no tire load. In the case of tires for which various standards have not been established, the standard state means a state of standard use according to the purpose of use of the tire and being loaded with no tire load.

The term "standard rim" refers to a wheel rim specified for the concerned tire by a standard included in a standardization system on which the tire is based, for example, the "normal wheel rim" in JATMA, "Design Rim" in TRA, and "Measuring Rim" in ETRTO.

The term "standard inner pressure" refers to air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 2, each of the concave marks 5 has a contour (5o) thereof composed by the inner wall surface 7. The bottom surface 6 and the inner wall surface 7 have a light contrast to increase the visibility of the concave mark 5 when a user observes the tire. It should be noted that in the present specification, when a user observes the tire means when the user observes the sidewall portions 3 of the tire 1 mounted on the vehicle staying still.

The bottom surface 6 includes a peripheral region 10 extending along the contour (5o) of the concave mark 5 and a main region 9 surrounded by the peripheral region 10. The peripheral region 10 includes a shadow region 11 and a non-shadow region 12. The shadow region 11 is a region where the shadow of the inner wall surface 7 is formed when light is assumed to be shed to the concave mark 5 from a first direction. The non-shadow region 12 is the region where the shadow of the inner wall surface 7 is not formed in the above assumption. In FIG. 2, the shadow region 11 and the non-shadow region 12 are shaded and conceptually shown for easy understanding of the contents of the present disclosure. Further, the first direction means any one direction, and in the present embodiment, the direction of an arrow C, which extends from the upper left diagonal position to the lower right diagonal position, corresponds to the first direction.

Figure 4:
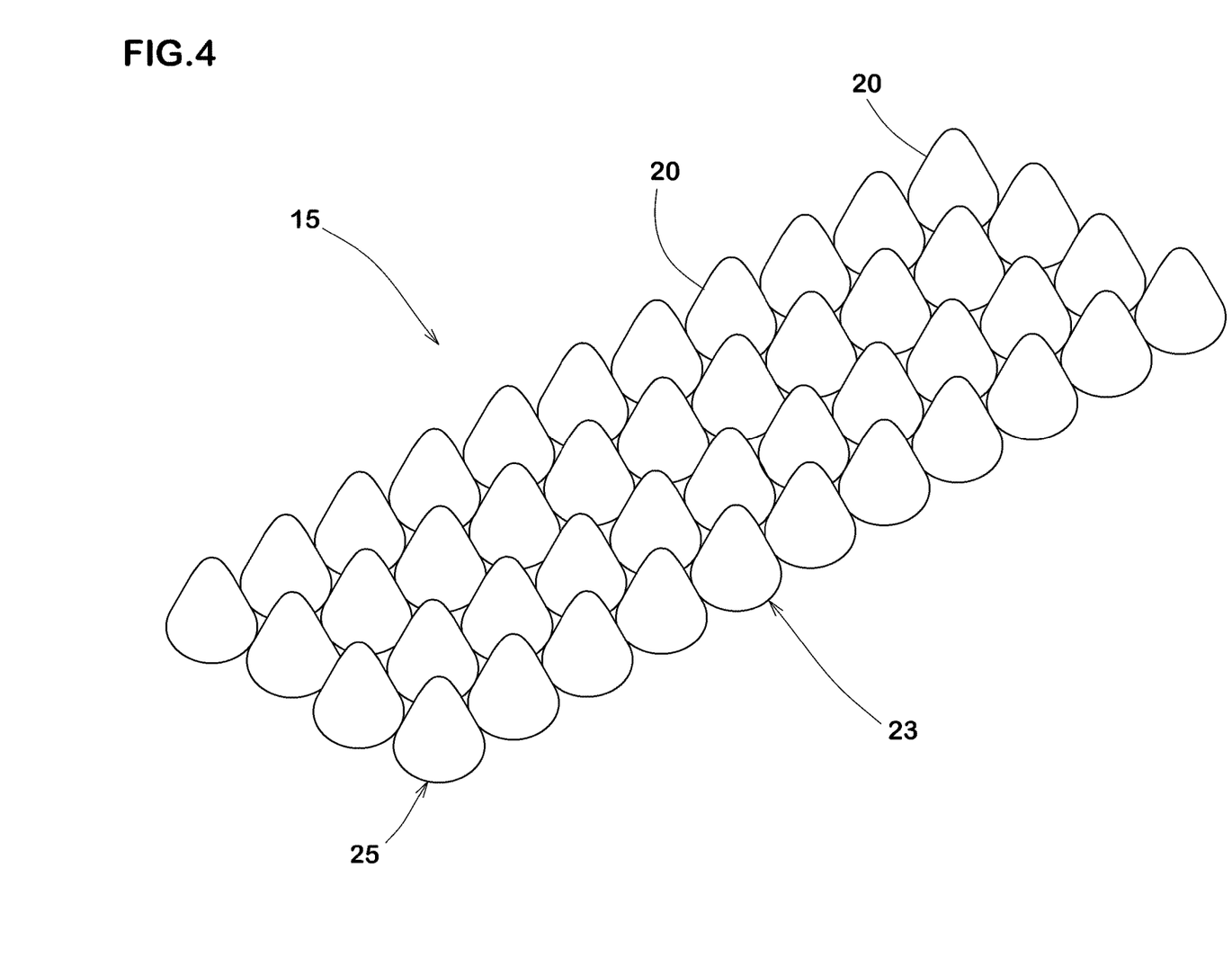
FIG. 4 is an enlarged perspective view of a region B of FIG. 2.

The shadow region 11 and the non-shadow region 12 are formed by uneven surfaces 15. FIG. 4 is an enlarged perspective view of a region B of FIG. 2 conceptually showing the uneven surfaces 15. As shown in FIG. 4, the uneven surfaces 15 are provided with a plurality of minute protuberances 20 to disperse and reflect light in multiple directions. Therefore, the uneven surfaces 15 are observed as regions with a high degree of blackness when a user observes the tire, and thus the contrast with other portions can be enhanced.

As shown in FIG. 2, in the present disclosure, the uneven surface 15 of the non-shadow region 12 has a width W2 smaller than a width W1 of the uneven surfaces 15 of the shadow region 11. It should be noted that each of the width W1 and the width W2 means a width measured in the direction perpendicular to the contour (5o) of the concave mark 5 in a respective one of the shadow region 11 and the non-shadow region 12. By adopting the above configuration, the tire of the present disclosure can exert excellent visibility of the concave marks 5 of the sidewall portions 3. The mechanism is as follows.

In general, the positions of the concave marks in the tire rotational direction are various at the time of observation of the tire. Therefore, it is assumed that the concave marks are exposed to light from various directions. For example, at the time of tire observation, when the concave mark is located at the highest point in a tire radial direction (hereinafter, such a state may be referred to as "the concave mark is at the 12 o'clock position"), light is shed from a direction opposite to when the concave mark is positioned at the lowest point in the tire radial direction (hereinafter, such a state may be referred to as "the concave mark is at the 6 o'clock position").

On the other hand, conventional concave marks may impair visibility and stereoscopic effect depending on the direction of light. For this reason, for example, even if the concave mark at the 12 o'clock position exhibits relatively high visibility, the contour of the concave mark at the 6 o'clock position may be difficult to see or the three-dimensional effect may be impaired.

In contrast, in the present disclosure, the shadow regions 11 and the non-shadow regions 12 of the concave marks 5 are formed by the uneven surfaces 15 on which multiple minute protuberances 20 are arranged, and the width W2 of each of the non-shadow regions 12 is smaller than the width W1 of each of the shadow regions 11. Thereby, the contours (5o) of the concave marks 5 are easily recognized no matter what direction the light hits the concave marks 5. Further, regardless of the position of the concave marks 5 in the tire rotational direction, the above-mentioned shadow regions 11 and the non-shadow regions 12 give the impression that light is emitted from a specific direction (the first direction described above), therefore, three-dimensional effect is given to the concave marks 5. By such a mechanism, the tire 1 of the present disclosure can exert excellent visibility of the concave marks 5 of the sidewall portions 3.

As described above, in the present disclosure, the visibility of the concave marks 5 can be increased without increasing the depth (d1) (shown in FIG. 3) of each of the concave marks 5. Therefore, the depth (d1) can be set to be smaller than the conventional one, thereby, an improvement in durability of the tire can be expected. In addition, by setting the depth (d1) to be small, the air resistance that the sidewall portions 3 receive when the tire 1 rotates becomes small, thereby, a reduction in rolling resistance of the tire can also be expected.

A more detailed configuration of the present embodiment will be described below. It should be noted that each configuration described below represents a specific aspect of the present embodiment. Therefore, it goes without saying that the present disclosure can achieve the effects described above even if it does not have the configuration described below. Further, even if any one of the configurations described below is applied alone to the tire of the present disclosure having the features described above, an improvement in performance according to each configuration can be expected. Furthermore, when some of the configurations described below are applied in combination, a combined improvement in performance can be expected according to the combination.

As shown in FIGS. 2 and 3, the main region 9 of the bottom surface 6 and the inner wall surface 7 of the present embodiment are not provided with the minute protuberances 20 and consist of flat surfaces. Therefore, the contrast with the uneven surfaces 15 is increased, thereby, the visibility is improved. However, each of the concave marks 5 is not limited to such a mode, and the main region 9 and the inner wall surface 7 may be provided with the minute protuberances 20 so as to create contrast with the peripheral region 10.

As shown in FIG. 2, in the present embodiment, as a preferred aspect, when it is assumed that light is applied to each of the concave marks 5 from the first direction, preferably 50% or more, more preferably 80% or more of the area where the shadow of the inner wall surface 7 is provided with the uneven surface 15. As a further preferred aspect, in the present embodiment, the uneven surface 15 is formed over the entire area where the shadow of the inner wall surface 7 is formed. However, the present disclosure is not limited to such an embodiment, and the uneven surface 15 may be formed in part of the area where the shadow of the inner wall surface 7 is formed.

The smaller the change of the width W1 of the uneven surface 15 of the shadow region 11 in a longitudinal direction of the contour (5o), the more the three-dimensional effect of the concave mark 5 can be enhanced. Therefore, it is preferred that a difference between a maximum value and a minimum value of the width W1 is 20% or less of the maximum value. As a more preferred aspect, in the present embodiment, the width W1 is substantially constant in the longitudinal direction of the contour (5o). Moreover, it is preferred that the width W1 is from 5% to 15% of a length L1 (shown in FIG. 1) in the tire radial direction of each of the concave marks 5.

In order to reliably improve the visibility, the uneven surface 15 having the width W2 is formed preferably in 50% or more and more preferably in 80% or more of a total length of the non-shadow region 12 (which is the length along the contour (5o)). In the present embodiment, substantially the entire non-shadow region 12 is formed by the uneven surface 15 having the width W2.

Regarding the uneven surface 15 of the non-shadow region 12, the smaller the change of the width W2 in the longitudinal direction of the contour, the more the three-dimensional effect of the concave mark 5 can be increased. Therefore, it is preferred that a difference between a maximum value and a minimum value of the width W2 is 20% or less of the maximum value. As a more preferred aspect, in the present embodiment, the width W2 is substantially constant in the longitudinal direction of the contour (5o). The width W2 of the uneven surface 15 of the non-shadow region 12 is, for example, from 20% to 70%, and preferably from 30% to 50% of the width W1 of the uneven surface 15 of the shadow region 11. Thereby, the visibility of the contour (5o) in the non-shadow region 12 at the time of the tire observation can be increased while maintaining the three-dimensional effect of each of the concave marks 5.

In the present disclosure, the shape of the minute protuberances 20 is not limited as long as the uneven surfaces 15 can exert the effect of dispersing and reflecting light. As shown in FIG. 4, in a preferred embodiment, the minute protuberances 20 are of the same size and the same shape.

Figure 5:
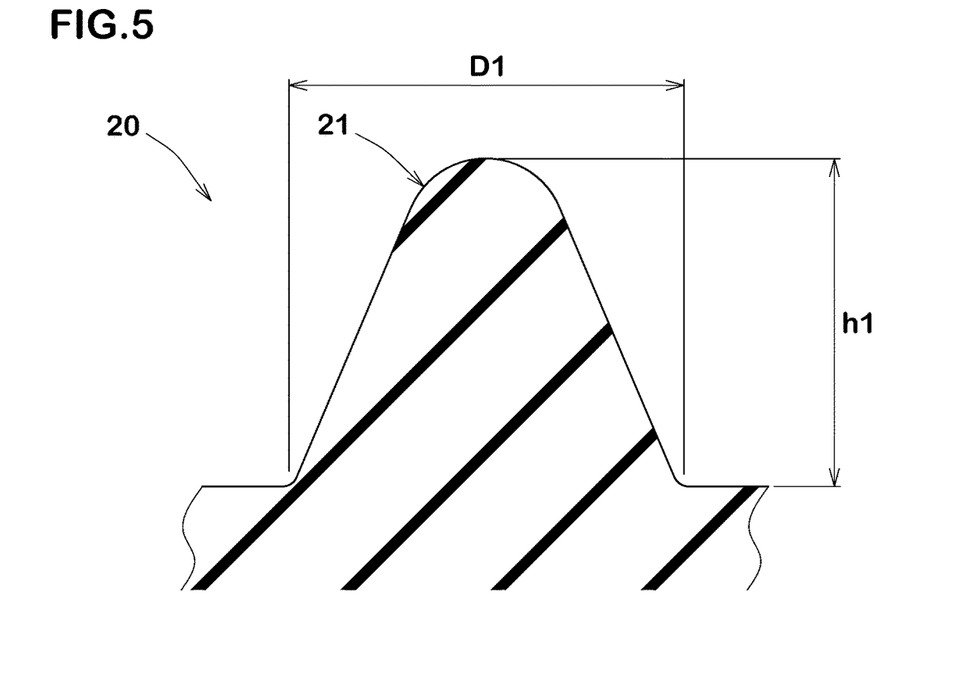
FIG. 5 is an enlarged cross-sectional view of one of minute protuberances of the present embodiment.

FIG. 5 shows an enlarged cross-sectional view of one of the minute protuberances 20 of the present embodiment. As shown in FIG. 5, each of the minute protuberances 20 in the present embodiment has a conical shape with a rounded apex 21, for example. As a result, in a front view of the concave marks 5, each of the multiple minute protuberances 20 has a circular contour.

Each of the minute protuberances 20 has a diameter D1 of 0.2 mm or more and 0.6 mm or less, preferably 0.3 mm or more and 0.5 mm or less, for example. It should be noted that the diameter D1 means the diameter of the root portion (bottom) of each of the minute protuberances 20. Each of the minute protuberances 20 has a height (h1) of 0.2 mm or more and 0.6 mm or less, preferably 0.3 mm or more and 0.5 mm or less, for example. The average number of the minute protuberances 20 per 1 sq·mm is from 2 to 8, for example. However, the present disclosure is not limited to such an aspect.

Figure 6:
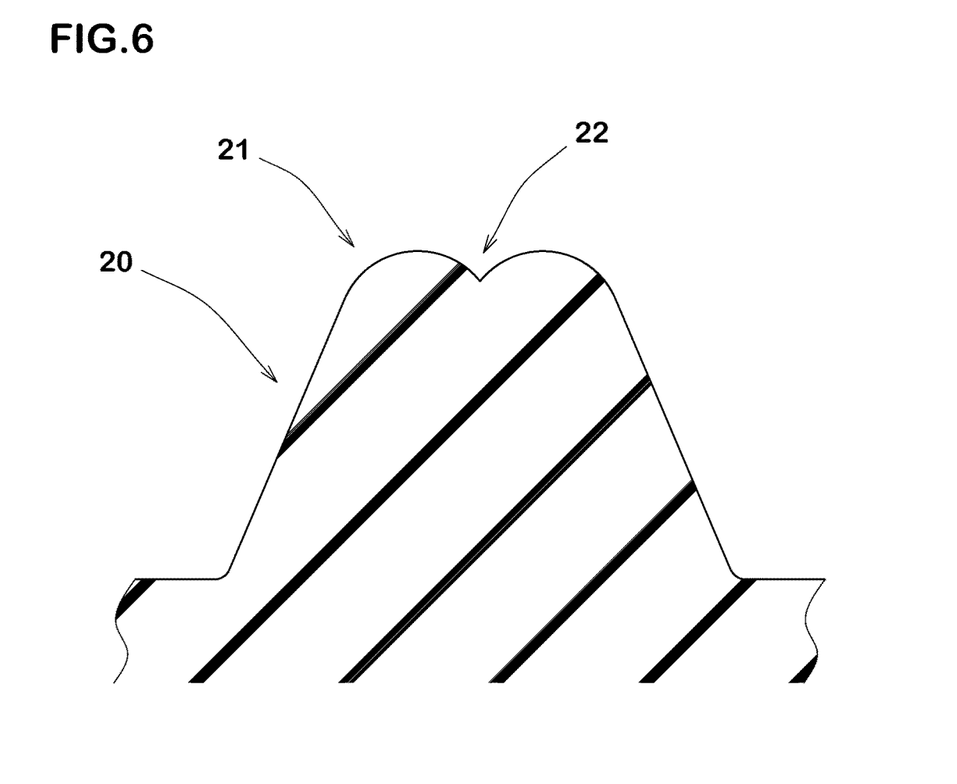
FIG. 6 is an enlarged cross-sectional view of one of the minute protuberances of another embodiment.

Various shapes can be employed for the minute protuberances 20. FIG. 6 shows an enlarged cross-sectional view of one of the minute protuberances 20 according to another embodiment of the present disclosure. As shown in FIG. 6, in this embodiment, a minute recess 22 is formed in the apex 21 of each of the minute protuberances 20. The minute protuberances 20 having the recesses 22 configured as such disperse and reflect light in various directions, therefore, it is possible that the degree of blackness of the uneven surfaces 15 is further increased.

Figure 7:
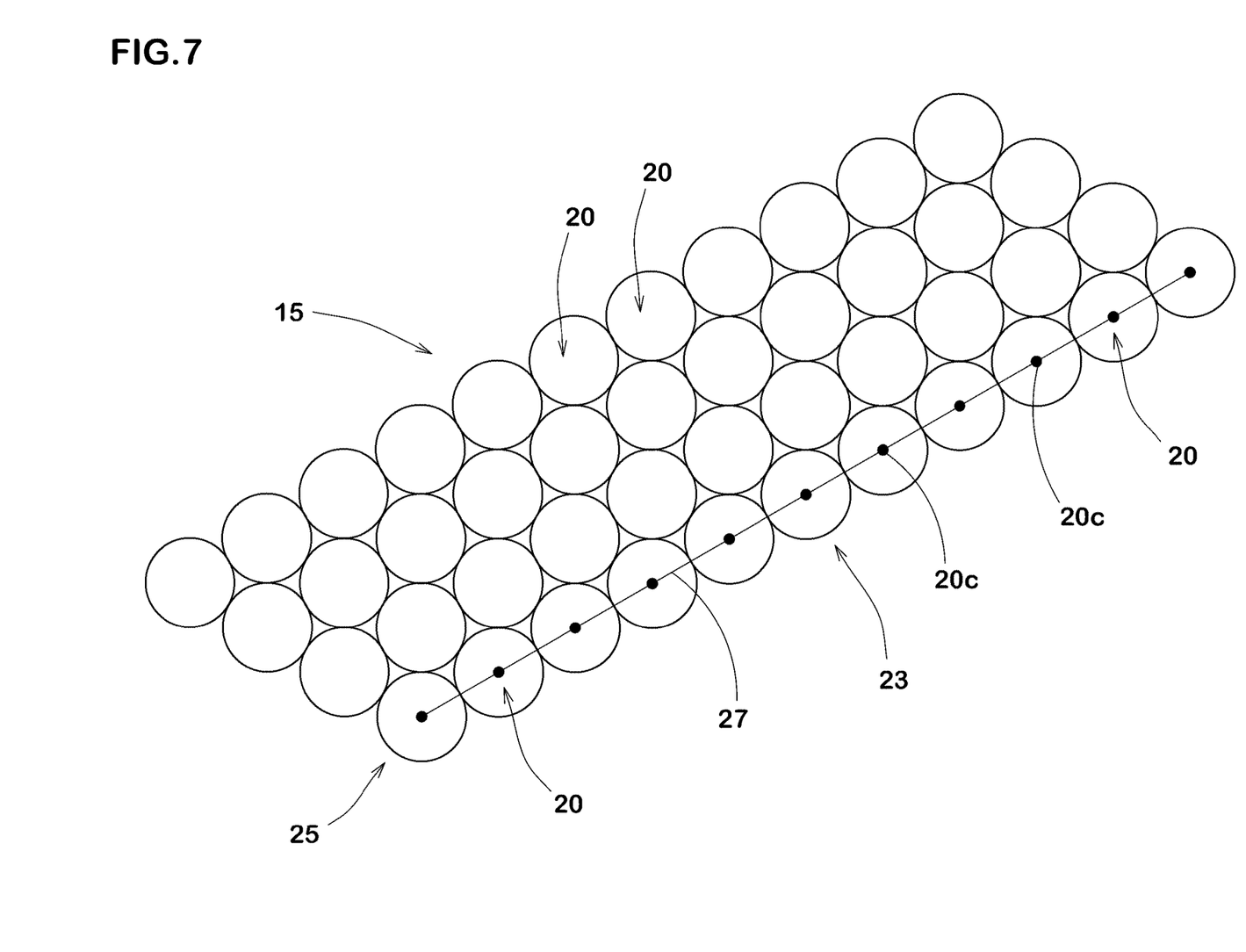
FIG. 7 is an enlarged plan view of the region B of FIG. 2.

FIG. 7 is an enlarged plan view of the region B in FIG. 2, showing the arrangement of the minute protuberances 20 in a front view of the concave marks 5. As shown in FIG. 7, it is preferred that each of the shadow region 11 and the non-shadow region 12 includes a region in which the minute protuberances 20 are arranged in closest packing. In a more preferred embodiment, the minute protuberances 20 are arranged in close packing in 80% or more of the shadow region 11 and the non-shadow region 12. Therefore, the blackness of the shadow region 11 and the non-shadow region 12 is further increased, thereby, the visibility of the concave marks 5 is improved.

As shown in FIG. 2, the peripheral region 10 includes a boundary 23 between the uneven surface 15 and the area where the minute protuberances 20 are not arranged. In addition, as shown in FIG. 4, each of the shadow region 11 and the non-shadow region 12 includes a boundary protuberance row 25 in which the minute protuberances 20 are arranged to form the boundary 23.

The minute protuberances 20 are arranged in the boundary protuberance row 25 so that the contours of the minute protuberances 20 are in contact with each other. As shown in FIG. 7, in the front view of each of the concave marks 5, a virtual line 27 connecting centroids (20c) of the contours of the minute protuberances 20 included in the boundary protuberance row 25 has a non-zigzag shape without containing any bends at an angle of 120 degrees or less. The boundary protuberance row 25 configured as such allows the boundary 23 to be closer to a straight line, which helps to further increase the contrast between the uneven surfaces 15 and the area where the minute protuberances 20 are not arranged. It should be noted that in the present embodiment, each of the minute protuberances 20 has a circular contour, and in each of the minute protuberances 20, the centroid (20c) corresponds to the center of the circular contour.

If the virtual line 27 is bent, it is preferred that the virtual line 27 is bent at an angle of 150 degrees or more. Further, in a more preferred embodiment, the virtual line 27 is a straight line. Thereby, the above-described effect can be further enhanced.

While detailed description has been made of the tire according to embodiments of the present disclosure, the present disclosure can be embodied in various forms without being limited to the illustrated embodiments.

EXAMPLES

Tires of size 245/40ZR18 having the concave marks of FIG. 1 were made by way of test according to the specifications listed in Table 1. Further, as Reference, a tire was made in which the uneven surface was formed in the shadow region but the uneven surface was not formed in the non-shadow region. The tire in the Reference is substantially the same as the tire shown in FIG. 1, except for the above. As the visibility, the visibility of the concave mark at the 12 o'clock position and the 6 o'clock position and the three-dimensional effect of the concave mark were tested for each of the test tires. Common specifications and test methods for the test tires are as follows.

The length L1 in the tire radial direction of the concave mark: 20 mm

The depth (d1) of the concave mark: 0.6 mm

<Visibility of Concave Mark at 12 o'Clock Position and 6 o'Clock Position>

Each of the test tires was mounted on a vehicle, and the visibility of the concave marks (mainly the clarity of the contours of the concave marks) were evaluated when the concave marks were at the 12 o'clock position and the 6 o'clock position. The results are indicated by an evaluation point based on the visibility of the Reference being 100, wherein the larger the numerical value, the better the visibility is at the respective position.

<Three-Dimensional Effect of Concave Mark>

Rectangular (40×200 mm) rubber samples containing the concave marks were cut from the tires, and the three-dimensional effect was evaluated comprehensively when the concave marks were observed from various directions. The results are indicated by an evaluation point based on the three-dimensional effect of the Reference being 100, wherein the larger the numerical value, the better the three-dimensional effect is.

The test results are shown in Table 1.

TABLE 1

|  | Reference | Example 1 | Example 2 | Example 3 | Example 4 | Example 5 | Example 6 |
|---|---|---|---|---|---|---|---|
| Presence or Absence of Uneven surface of Non-shadow region | Absence | Presence | Presence | Presence | Presence | Presence | Presence |
| Width W2 of Uneven surface of Non-shadow region/Width W1 of Uneven surface of Shadow region [%] | 0 | 10 | 20 | 50 | 70 | 80 | 20 |
| Shape of Virtual line of Boundary protuberance row | non-zigzag | non-zigzag | non-zigzag | non-zigzag | non-zigzag | non-zigzag | zigzag |
| Visibility of Concave Mark at 12 o'clock position [evaluation point] | 100 | 110 | 110 | 110 | 110 | 110 | 105 |
| Visibility of Concave Mark at 6 o'clock position [evaluation point] | 100 | 102 | 140 | 150 | 150 | 150 | 120 |
| Three-dimensional effect of Concave mark [evaluation point] | 100 | 130 | 130 | 120 | 110 | 102 | 105 |

As shown in Table 1, the visibility at each position is improved and the three-dimensional effect is also improved for the concave marks in Examples. That is, in the present disclosure, it was confirmed that the concave marks on the sidewall portions exerted excellent visibility.

STATEMENT OF DISCLOSURE

The present disclosure includes the following aspects.

[Present Disclosure 1]
A tire including a pair of sidewall portions, wherein
an outer surface of at least one of the sidewall portions includes at least one concave mark recessed from a reference surface,
the or each concave mark includes a bottom surface and an inner wall surface extending in a depth direction of the or each concave mark to surround the bottom surface,
the bottom surface includes a peripheral region extending along a contour of the or each concave mark and a main region surrounded by the peripheral region,
the peripheral region includes a shadow region and a non-shadow region,
the shadow region is a region where the shadow of the inner wall surface is formed when light is assumed to be shed to the or each concave mark from a first direction,
the non-shadow region is a region where the shadow of the inner wall surface is not formed when light is assumed to be shed to the or each concave mark from the first direction,
each of the shadow region and the non-shadow region is formed with an uneven surface provided with a plurality of minute protuberances, and
a width (W2) of the uneven surface of the non-shadow region measured in a direction perpendicular to the contour is smaller than a width (W1) of the uneven surface of the shadow region measured in a direction perpendicular to the contour.

[Present Disclosure 2]
The tire according to Present Disclosure 1, wherein the width (W2) of the uneven surface of the non-shadow region is 20% or more and 70% or less of the width (W1) of the uneven surface of the shadow region.

[Present Disclosure 3]
The tire according to Present Disclosure 1 or 2, wherein the width (W1) of the uneven surface of the shadow region is 5% or more and 15% or less of a length in a tire radial direction of the or each concave mark.

[Present Disclosure 4]
The tire according to any one of Present Disclosures 1 to 3, wherein
each of the minute protuberances has a circular contour in a front view of the or each mark, and
each of the shadow region and the non-shadow region includes a region in which the minute protuberances are arranged in closest packing.

[Present Disclosure 5]
The tire according to any one of Present Disclosures 1 to 4, wherein
the peripheral region includes a boundary between the uneven surface and an area where the minute protuberances are not arranged,
each of the shadow region and the non-shadow region includes a boundary protuberance row in which the minute protuberances are arranged so as to form the boundary, and
in a front view of the or each concave mark, a virtual line connecting centroids of contours of the minute protuberances included in the boundary protuberance row has a non-zigzag shape without containing any bends at an angle of 120 degrees or less.

[Present Disclosure 6]
The tire according to Present Disclosure 5, wherein the virtual line is a straight line or bent at an angle of 150 degrees or more.

[Present Disclosure 7]
The tire according to Present Disclosure 5 or 6, wherein
in a front view of the or each concave mark, each of the minute protuberances has a circular contour, and
the minute protuberances are arranged so that the contours of the minute protuberances are in contact with each other in the boundary protuberance row.

DESCRIPTION OF REFERENCE SIGNS 3 sidewall portion
3s outer surface 5 concave mark
5o contour
6 bottom surface
7 inner wall surface
9 main region
10 peripheral region
11 shadow region
12 non-shadow region
15 uneven surface
20 minute protuberance
W1 width of uneven surface of shadow region
W2 width of uneven surface of non-shadow region

The invention claimed is:

1. A tire comprising a pair of sidewall portions, wherein an outer surface of at least one of the sidewall portions includes at least one concave mark recessed from a reference surface,
the or each concave mark includes a bottom surface and an inner wall surface extending in a depth direction of the or each concave mark to surround the bottom surface,
the bottom surface includes a peripheral region extending along a contour of the or each concave mark and a main region surrounded by the peripheral region,
the peripheral region includes a shadow region and a non-shadow region,
the shadow region is a region where a shadow of the inner wall surface is formed when light is assumed to be shed to the or each concave mark from a first direction,
the non-shadow region is a region where the shadow of the inner wall surface is not formed when light is assumed to be shed to the or each concave mark from the first direction,
each of the shadow region and the non-shadow region is formed with an uneven surface provided with a plurality of minute protuberances,
a width (W2) of the uneven surface of the non-shadow region measured in a direction perpendicular to the contour is smaller than a width (W1) of the uneven surface of the shadow region measured in a direction perpendicular to the contour,
each of the minute protuberances has a conical shape with a rounded apex and a circular contour in a front view of the or each concave mark,
the apex is provided with a minute recess,
in a cross-sectional view of each of the minute protuberances passing all through an axis of the conical shape, the apex has a profile in which two arcs each extend upward in a convex shape, are arranged side by side, and connect with each other, wherein a connection portion of the two arcs forms the minute recess.

2. The tire according to claim 1, wherein the width (W2) of the uneven surface of the non-shadow region is 20% or more and 70% or less of the width (W1) of the uneven surface of the shadow region.

3. The tire according to claim 1, wherein the width (W1) of the uneven surface of the shadow region is 5% or more and 15% or less of a length in a tire radial direction of the or each concave mark.

4. The tire according to claim 1, wherein each of the shadow region and the non-shadow region includes a region in which the minute protuberances are closely packed.

5. The tire according to claim 1, wherein
the peripheral region includes a boundary between the uneven surface and an area where the minute protuberances are not arranged,
each of the shadow region and the non-shadow region includes a boundary protuberance row in which the minute protuberances are arranged so as to form the boundary, and
in a front view of the or each concave mark, a virtual line connecting centroids of contours of the minute protuberances included in the boundary protuberance row has a non-zigzag shape without containing any bends at an angle of 120 degrees or less.

6. The tire according to claim 5, wherein the virtual line is a straight line or bent at an angle of 150 degrees or more.

7. The tire according to claim 5, wherein the minute protuberances are arranged so that the contours of the minute protuberances are in contact with each other in the boundary protuberance row.

8. The tire according to claim 1, wherein a depth of the or each concave mark is 1.5 mm or less.

9. The tire according to claim 1, wherein a depth of the or each concave mark is 1.0 mm or less.

10. The tire according to claim 1, wherein a depth of the or each concave mark is from 0.4 to 0.7 mm.

11. The tire according to claim 1, wherein the main region and the inner wall surface are not provided with the minute protuberances and formed with flat surfaces.

12. The tire according to claim 1, wherein a difference between a maximum value and a minimum value of the width (W1) of the uneven surface of the shadow region is 20% or less of the maximum value of the width (W1) of the uneven surface of the shadow region.

13. The tire according to claim 12, wherein a difference between a maximum value and a minimum value of the width (W2) of the uneven surface of the non-shadow region is 20% or less of the maximum value of the width (W2) of the uneven surface of the non-shadow region.

14. The tire according to claim 1, wherein the uneven surface of the non-shadow region is provided over 50% or more of a total length of the non-shadow region along the contour.

15. The tire according to claim 1, wherein each of the minute protuberances has a diameter of 0.2 mm or more and 0.6 mm or less at a root portion thereof.

16. The tire according to claim 1, wherein each of the minute protuberances has a height of 0.2 mm or more and 0.6 mm or less.

17. The tire according to claim 1, wherein an average number of the minute protuberances per 1 sq.mm is from 2 to 8.

18. The tire according to claim 1, wherein the first direction is a direction extending from an upper left diagonal position to a lower right diagonal position of the or each concave mark.

19. The tire according to claim 1, wherein each of the minute protuberances has a profile in which two triangles each having an arcuate apex that extends upward in a convex shape overlap and are shifted in a direction parallel to bases of the two triangles so that the bases are aligned in one straight line and the arcuate apexes connect in the cross-sectional view of each of the minute protuberances.

* * * * *